Figure 2:
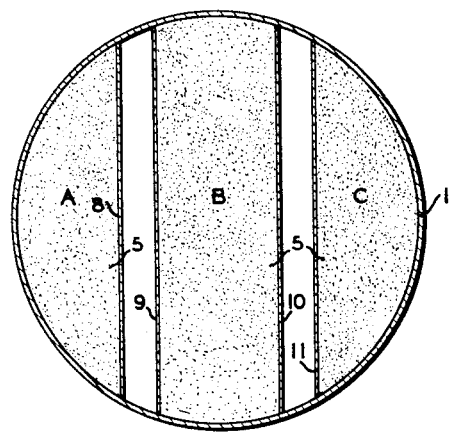

Dec. 12, 1933.  A. G. CONNOLLY  1,938,998

TREATMENT OF HYDROCARBON OILS

Filed June 8, 1931

INVENTOR
ARTHUR G. CONNOLLY
BY Frank L. Belknap
ATTORNEY

Patented Dec. 12, 1933

1,938,998

UNITED STATES PATENT OFFICE 1,938,998

TREATMENT OF HYDROCARBON OILS

Arthur G. Connolly, Chicago, Ill., assignor to Universal Oil Products Company, Chicago, Ill., a corporation of South Dakota Application June 8, 1931. Serial No. 542,719

1 Claim. (Cl. 196—96)

This invention relates to the treatment of hydrocarbon oils and more particularly refers to the treatment of hydrocarbon vapors with polymerizing materials to improve their quality.

The advantages of treating hydrocarbon distillates in the vapor-phase to improve their quality, particularly with respect to gum content, color, odor and stability, is now well recognized in the oil refining industry. In one successful existing method of treating hydrocarbon distillates in the vapor-phase to effect separation of their deleterious components, the vapors to be treated are passed downward through a bed of treating or polymerizing material such as contact clays, diatomaceous earth, fuller's earth and the like. Heavy condensate containing the polymerization products flow downward, concurrent with the flow of vapors, from the points at which they are formed to the bottom of the bed of treating material. The treated vapors and the heavier liquid products resulting from the treatment are then separated by gravity and separately withdrawn from the treater. Since the polymerizing action of the treating material upon the vapors is essentially a surface phenomenon, the presence of condensate, containing the deleterious polymerization products, greatly impairs the efficiency of the treating material by reducing the surface of this material in contact with the vapors and also by contamination of the treating material.

The present invention provides an improvement to this method of treating whereby the polymerizing material is rendered more useful and its treating efficiency is greatly increased.

The improvement provided by the present invention comprises dividing the bed of polymerizing or treating material into a plurality of beds, passing the vapors to be treated through said beds of treating material in series and providing means for separating condensate containing the deleterious products of the treatment, such as heavy polymers, from each of said beds of treating material and preventing said condensate from flowing through succeeding beds of the treating material. It will be evident that, by this improved method, the treatment of the vapors is divided into several successive stages, the principal advantage residing in the fact that condensate containing the deleterious treating products is separated from the vapors and from the treating material following each of said treating stages, thus minimizing impairment of the action of the treating material, due to the contact of said condensate with its surface.

It will be understood that, according to the principles of the present invention, the treatment may be divided into any desired number of stages through each of which the vapors may be passed in series and following each of which the condensate formed within the treating stage may be separated from the treating material and from the vapors. The principles of the invention may be advantageously applied to the treatment of vapors with contacting and polymerizing materials such as fuller's earth, diatomaceous earths and contact clays generally, or to the chemical treatment of vapors by any means and the adaptability of the principles of the invention are therefore not limited to the particular type of treatment hereinafter described not to any other specific treating methods. The improvements provided are limited only to use in treating processes wherein it is desirable to separate deleterious materials at various stages of such treatment. It will also be understood that this improved method of treatment may be accomplished by different means all of which fall within the scope of the present invention. One such means is illustrated in the attached diagrammatic drawing, the following description of which embraces also a description of the process of the invention.

Figure 1:
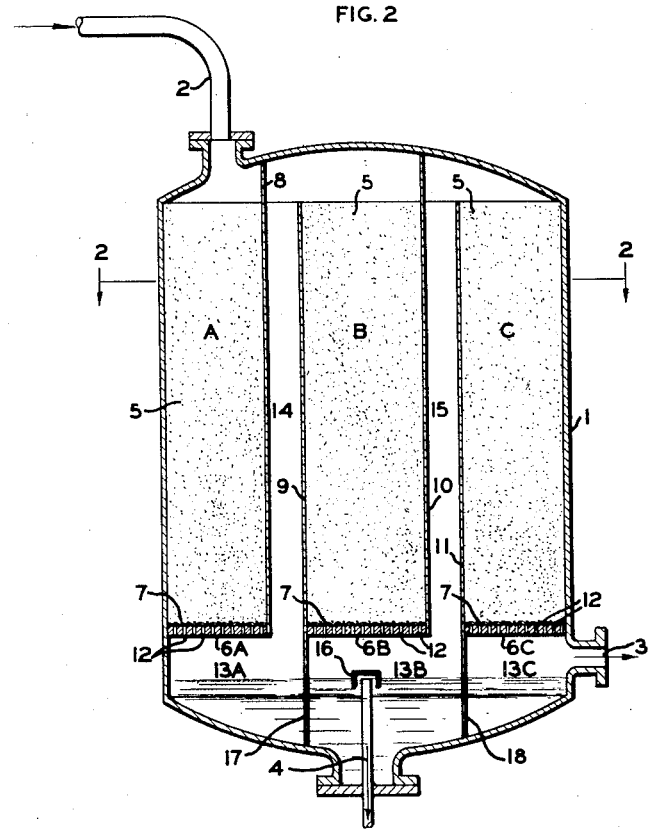

Referring now to the drawing, Figure 1 is a cross-sectional side elevation of a treating tower, embodying the improvements provided by the present invention, and Figure 2 is a sectional plan view of the same treater taken along a place indicated by line 2—2, in Figure 1. The outer shell of the treater is indicated at 1. The vapors to be treated which may, for example, be cracked hydrocarbon vapors or any other oil in the vapor-phase requiring treatment to improve its characteristics, particularly with respect to gum content, color, odor and stability, may be introduced to the treater through line 2. The treated vapors may be withdrawn through discharge 3 to condensation, cooling and collection or to fractionation or to any other desired treatment. Components of the vapors condensed during their treatment, which condensate may comprise or contain substantially all or a large portion of the deleterious components of the vapors which, by the treatment afforded, form polymerization products easily separated from the vapors, may be withdrawn from the treater through line 4.

It will be noted that the interior of the treater is divided into a series of compartments A, B and C, each of which contain treating material 5.

Examples of the treating materials which may be used are fuller's earth, contact clays, diatomaceous earths and the like. The treating material 5 in compartments A, B and C is supported upon perforated plates 6a, 6b and 6c respectively and screens 7, of sufficiently small mesh to retain the treating material, may be provided above the various perforated plates. The retaining walls of compartment A are provided by a portion of the outer shell 1 of the treater and by a plate 8 extending vertically from the upper head of the shell of the treater to perforated plate 6a, as indicated in Figure 1, and horizontally between the side walls of the cylindrical portion of shell 1, as indicated more clearly in Figure 2. The confining walls of compartment B are provided, in part, by portions of the side walls of shell 1 of the treater, by a plate 9 extending vertically from the lower head of shell 1 of the treater to a point somewhat below the upper head of shell 1 and by a plate 10 which extends vertically from the upper head of shell 1 to perforated plate 6b. Plates 9 and 10 each extend horizontally between opposite sides of the cylindrical portion of shell 1. The retaining walls of compartment C are defined by a portion of the cylindrical portion of shell 1 and by a plate 11 extending vertically from the lower head of shell 1 to a point somewhat below the upper head of shell 1 and extending horizontally between opposite sides of the cylindrical portion of shell 1. It will be understood that the arrangement just described, which is illustrated in the drawing, is only one of the many arrangements by means of which the bed of treating material may be sub-divided for the purpose of providing a multiplicity of treating stages through which the vapors may pass in series.

The vapors to be treated enter the first compartment or treating stage A above the bed of treating material 5, passing downward therethrough, through screen 7 and through the perforations 12, in plate 6a, into compartment 13a of the treater which is directly below compartment A. The vapors thence pass upward through space 14, provided between plates 8 and 9, emerging therefrom above the bed of treating material in compartment B, passing downward through said bed of treating material through screen 7 and through the perforations 12, in plate 6b, into compartment 13b of the treater which is directly below compartment B. The vapors thence pass upward through space 15, provided between plates 10 and 11, emerging above the bed of treating material in compartment C, passing downward through said bed of treating material through screen 7 and through perforations 12, in plate 6c into compartment 13c which is directly below compartment C. Condensate formed in each of the beds of treating material in compartments A, B and C also flows downward concurrent with the vapors passing through said beds and collects in the lower portion of each of the zones 13a, 13b and 13c. It will be evident that in this manner condensate which would otherwise impair the efficiency of the treating material may be separated from the material and from the vapors undergoing treatment following each of the several treating stages.

A level of condensate may be maintained in the lower portion of the treater and plates 9 and 11 may terminate or may have openings 17 and 18 below the liquid level permitting free communication of liquid compartments 13a, 13b and 13c but preventing short-circuiting of vapors. As indicated in the drawing, polymer draw-off line 4 may extend within the treater for a distance corresponding to the height of the desired liquid level, to insure this level being maintained at all times, in which case a suitable trap or liquid seal, not shown, may be provided within line 4 or a cap such as indicated at 16 may be provided to prevent passage of vapors through line 4. It will be understood that, if desired, compartments 13a, 13b and 13c may be completely separated by means of plates 9 and 11 and condensate may be withdrawn from each of these compartments, the three streams of condensate preferably being commingled outside the treater and passed together to storage or to further treatment, as desired.

The process of the present invention may be performed under any desired pressure ranging from substantially atmospheric or even sub-atmospheric pressure, if so desired, to relatively high super-atmospheric pressures of the order of 100 to several hundred pounds per square inch. Ordinarily the vapor-phase treatment is effected under substantially the same pressure as that utilized in that portion of the refining process or cracking process immediately prior to the treater. For example, if cracked vapors, which have been fractionated under relatively high super-atmospheric pressure, are to be treated, the treatment may be and is preferably accomplished under substantially the same pressure as that utilized in the fractionator of the cracking system, or if cracked or straight-run vapors from a still, fractionator or other refining step operated under substantially atmospheric or relatively low super-atmospheric pressure are to be treated, the treating may also be done under substantially atmospheric or relatively low super-atmospheric pressure. Generally speaking substantial super-atmospheric pressures are preferred for the vapor-phase treatment of distillates and particularly cracked distillates as it has been found that the utilization of such pressures will ordinarily greatly prolong the effective treating life of the clay or other treating material, making it possible to treat a greater volume of vapors with the same amount of clay.

As a specific example of the advantages which may accrue from the operation of the process of the present invention as compared with ordinary vapor-phase treating methods, let us assume that the oil to be treated comprises a distillate, in the form of vapors from the fractionator of a cracking process, boiling substantially within the range of motor fuel having a gum content of approximately 250 mgs. a yellow color and of poor gum and color stability even after the usual liquid-phase chemical treatment. By passing these vapors through a bed of fuller's earth, employing the usual methods of vapor-phase treatment with such material, the treated vapors may be improved to a 27 color, may have a gum content of approximately 40 mgs. and may be fairly stable with regards to color and gums upon prolonged exposure to sunlight. When operating at substantially atmospheric pressure or under relatively low super-atmospheric pressure, a ton of treating material may treat some 2500 barrels of distillate before it is necessary to renew the treating material and when the process is operated under substantial super-atmospheric pressures of the order of 100 pounds or more per square inch, it may be possible to treat as much as 3200 barrels of distillates per ton of treated material. By employing the improved method of the present invention, the efficiency of the treating material may be increased, making it possible at substantially atmospheric or relatively low super-atmospheric operating pressures to treat 3800 barrels of distillate per ton of treating material or under relatively high super-atmospheric pressures to treat as much as 4800 barrels of distillate per ton of treated material. In addition, the absence of deleterious products in the treating material, due to frequent removal at various stages in the treatment, so improves the treating process that the same distillate, above mentioned, may be improved to a 30 plus color, having a gum content of about 20 mgs., and possessing exceptionally good color and gum stability.

I claim as my invention:

An apparatus for refining hydrocarbon vapors comprising a chamber, a series of spaced bodies of solid refining material in said chamber, vertical partitions in the chamber forming vapor spaces between said bodies, horizontal perforated plates supporting said bodies and spaced from the bottom of the chamber to form a liquid accumulating compartment in the lower portion of the chamber, means for introducing vapors to the chamber adjacent to the first body of the series, means for withdrawing the vapors after passage through the last body of the series, and means for removing liquid from said compartment.

ARTHUR G. CONNOLLY.